L. I. HARTMEYER.
AUTOMOBILE MARKING DEVICE.
APPLICATION FILED FEB. 28, 1921.
1,377,345.
Patented May 10, 1921.
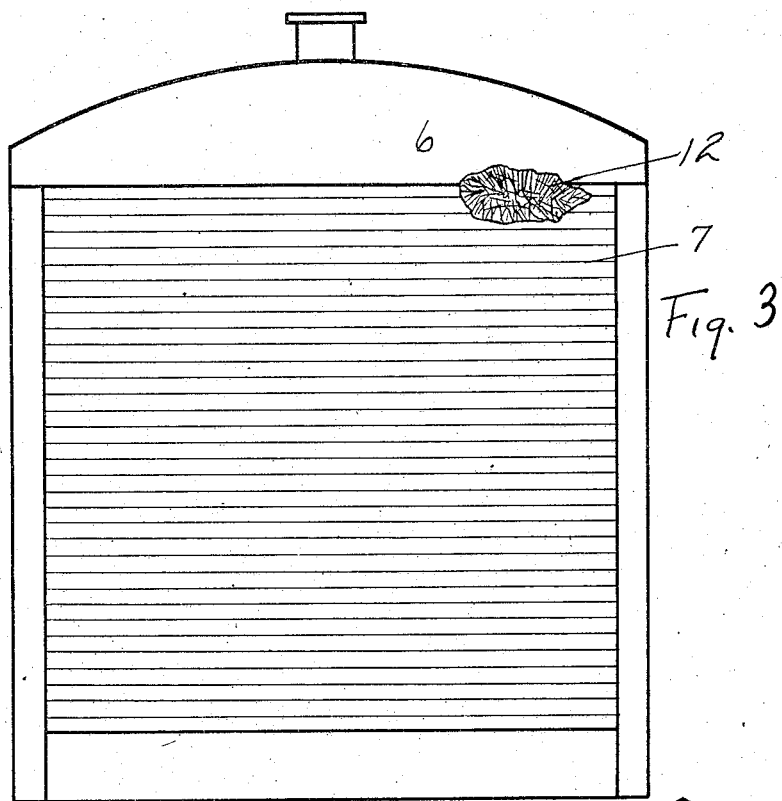
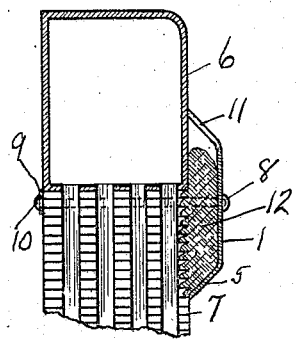
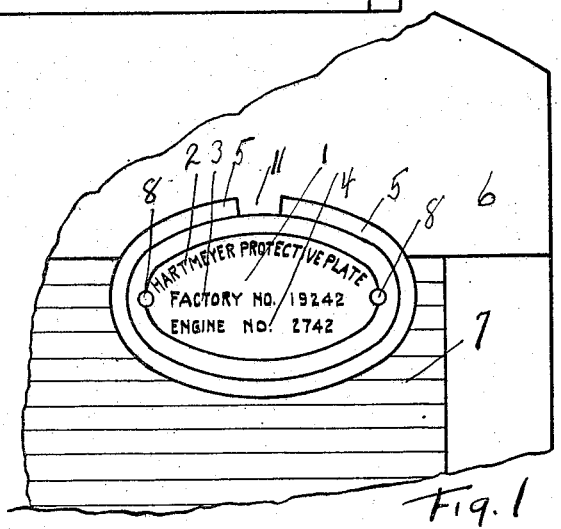
INVENTOR
L. I. HARTMEYER.
BY Karl Shensing
HIS ATTORNEY

UNITED STATES PATENT OFFICE.

LEWIS I. HARTMEYER, OF CLEVELAND, OHIO.

AUTOMOBILE-MARKING DEVICE.

1,377,345.

Specification of Letters Patent.

Patented May 10, 1921.

Application filed February 28, 1921. Serial No. 448,525.

*To all whom it may concern:*

Be it known that I, LEWIS I. HARTMEYER, a citizen of the United States, residing at Cleveland, Ohio, have invented certain new and useful Improvements in Automobile-Marking Devices, of which the following is a specification.

My invention comprises a plate preferably to be fastened in a conspicuous place on the automobile associated with means, preferably concealed by the plate, which when the plate is removed will leave a conspicuous, easily noticed, irregularity or mark upon the automobile.

Without intending to limit my invention to the specific details shown, I have illustrated in the accompanying drawings one form of a practical embodiment of the invention. In the drawings Figure 1 is a fragmentary front view of the plate in position on the front of the automobile. Fig. 2 is a central transverse vertical section through the plate of Fig. 1. Fig. 3 is a front view of an automobile radiator from which the plate has been removed.

I prefer to provide a plate 1 with a suitable legend 2. The legend 2 is not essential to the present invention but in the present instance I have illustrated the plate 1 as provided with the words "Hartmeyer protective plate." For purposes of ready identification I may also put on the plate the line 3 reading "Factory No. 19242" corresponding with the usual factory number placed by the manufacturer on the automobile generally in some inconspicuous place. Likewise in the present instance I have shown on the plate 1 a line 4 reading "Engine No. 2742" corresponding to the serial number generally placed on the automobile engine itself by the automobile manufacturer.

As a secondary matter the plate thus marked when compared with the factory number and the engine number of the automobile to which the plate is attached may afford a simple means of determining whether the plate is on the automobile to which it belongs. If there is found to be a variance between the numbers on this plate or either of them and those carried by the automobile it is a cause for investigation to determine whether the car has been stolen or changed in an illegitimate manner. Of course, the same question will arise if either of these numbers has been removed or altered.

The plate 1 may be of any suitable or desired shape or form but preferably is provided with an upset collar 5 extending around substantially its entire circumference. The plate may be fastened to any suitable conspicuous portion of the automobile. I prefer, however, to arrange it at the front of the automobile and as shown in the accompanying drawings it may be applied to the radiator. Although not essential, but as here shown, the plate extends over not merely a part of the upper smooth part 6 of the radiator but also covers a portion of the heat conducting vanes 7 of the radiator. Any suitable means may be provided for attaching the plate to the automobile but preferably means will be employed which do not admit of easy removal. In the accompanying drawings I have shown rivets 8 extending through the plate and radiator and provided with washers 9 at their inner ends over which the heads of the rivets may be upset at 10. The arrangement is such that the plate or the collar is held more or less snugly against the portion of the automobile to which the device is attached and a space is provided thus between the plate 1 and the marked automobile. I prefer to cut out a portion of the collar 5 so as to leave a recess 11 preferably at the top of the plate 1 when in position so as to give access to the inclosed space under the plate 1.

One of the evils incident to the use of automobiles under present conditions is that thieves find it easy to steal cars and readily and quickly efface the identifying marks. My apparatus so far described might be entirely removed from the automobile and then the factory number and engine number erased or changed and so place the car beyond suspicion. In order to overcome this condition and make the car if stolen a continuing subject of suspicion and investigation I prefer to provide some means which will make a more or less indelible mark upon the automobile. To this end I insert through the recess 11 in the collar 5 a substance which while it may assist in holding the plate 1 on the automobile will surely make upon the automobile itself a substantially indelible mark. Many hot melted metals in liquid form will answer, but one substance which I find convenient to use is ordinary commercial solder. I find that solder becomes more or less intimately associated with the automobile or base on which it is put and its mark is substantially ineradicable. This is so when the surface on which it flows in a plain smooth portion of the automobile but of course the effect is very much enhanced when it flows over an irregular or perforated surface and I find the heat conducting vanes 7 of a radiator especially adapted to this end. If applied to a smooth surface the surface may be broken and roughened before the heated metal is poured in. In the accompanying drawings, then, I have shown solder 12 lying between the plate 1 and the radiator. When poured in through the recess 11 in the collar 5 the solder enters between the thin metallic radiator vanes 7 and also adheres to the vanes 7 and to the smooth surface 6 of the upper part of the radiator in the specific position shown in the drawings. If a car marked as shown in Fig. 2 is stolen the rivet 8 may be cut and the plate removed but there will then be left the smeary blotch made up of the solder 12 as indicated in Fig. 3. It is substantially impossible to entirely remove the signs of such a blotch of solder and a considerable period of time is required in order to make the blotch even partially inconspicuous. That adhering to the thin vanes is substantially permanent. When the automobile is stolen, if an effort is made to change its identity by removing or altering the factory number or engine number it is, of course, essential to make corresponding changes on the name plate 1. This being in a conspicuous place on the car the evidences of change are readily seen and if such a changed plate is observed an investigation will probably lead to an identification of the car and a possible apprehension of the thief. If, however, the thief entirely removes the plate 1 the automobile is provided with the conspicuous solder blotch 12 as shown in Fig. 3 so that it may be readily noticed. If the car is standing when first noticed it may be investigated. Detectives, police and other investigators on becoming familiar with the condition will realize that a car marked with the solder blotch 12 is worthy of suspicion and when one is seen on the public highway it may be easily noticed and the car stopped and an investigation instituted. Of course, it will be understood that the present invention does not actually prevent automobiles from being stolen but it does tend to aid in making it impossible for the thief to sell a stolen automobile or to operate it without arousing constant suspicion and therefore the employment of my device will render the automobile to which it is applied more or less immune from the theft especially by the professional automobile thieves who are so prevalent now in our larger cities.

I claim as my invention:

1. An automobile marking device comprising a suitable portion of the automobile as a base, a plate bearing identifying marking, a collar surrounding the plate and holding it from contact with the base, an aperture in the collar, rivets holding the plate in place and the collar against the base, and melted metal inserted through the aperture and filling the space between the plate and base and intimately associated with the base.

2. An automobile marking device comprising a suitable portion of the automobile having an irregular surface as a base, a plate bearing identifying marking, a collar surrounding the plate and holding it from contact with the base, an aperture in the collar, rivets holding the plate in place and the collar against the base, melted metal inserted through the aperture and filling the space between the plate and base and entering the irregularities in the base.

3. An automobile marking device comprising a suitable portion of the automobile as a base, a plate bearing identifying marking, means for holding the plate onto the base, and melted metal concealed by the plate intimately associated with the base.

LEWIS I. HARTMEYER.